(12) United States Patent
Tuohimaa et al.

(10) Patent No.: US 7,216,922 B2
(45) Date of Patent: May 15, 2007

(54) FAIRING PANEL RETAINER APPARATUS

(75) Inventors: Clyde R. Tuohimaa, Lynnwood, WA (US); Philip A. Swan, Winnipeg (CA); Tim T. Hian, Lynnwood, WA (US); Neil P. Doherty, Winnipeg (CA)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 11/168,292

(22) Filed: Jun. 29, 2005

(65) Prior Publication Data

US 2007/0018482 A1 Jan. 25, 2007

(51) Int. Cl.
*B60J 1/00* (2006.01)

(52) U.S. Cl. .............................. 296/180.1; 296/180.2; 244/130

(58) Field of Classification Search ............. 296/180.1, 296/78.1, 180.2, 180.4, 180.3, 180.5, 29; 244/110 B, 130; 180/903; 105/1.2
See application file for complete search history.

(56) References Cited

U.S. PATENT DOCUMENTS

| | | | | |
|---|---|---|---|---|
| 2,341,829 A | * | 2/1944 | Tinnerman | 411/84 |
| 3,004,645 A | * | 10/1961 | Moul, Jr. | 244/131 |
| 4,699,062 A | * | 10/1987 | Lewis et al. | 102/378 |
| 4,801,058 A | * | 1/1989 | Mullins | 244/55 |
| 4,861,095 A | * | 8/1989 | Zajic | 296/184.1 |
| 5,031,836 A | * | 7/1991 | Ward | 244/130 |
| 5,071,092 A | * | 12/1991 | Williams et al. | 244/130 |
| 5,540,173 A | * | 7/1996 | Tucker et al. | 114/382 |
| 5,876,088 A | * | 3/1999 | Spears | 296/180.2 |
| 7,111,448 B2 | * | 9/2006 | Anderson | 60/204 |
| 7,118,170 B2 | * | 10/2006 | Montanvert et al. | 296/29 |

* cited by examiner

*Primary Examiner*—Kiran B. Patel
(74) *Attorney, Agent, or Firm*—Baker & Hostetler, LLP

(57) ABSTRACT

A fairing panel retainer can include a retainer strip that is configured to conform to the contour of a vehicle body. The retainer strip includes alternating body attachment segments and raised panel attachment segments in a generally corrugated configuration. In addition, each of the body attachment segments includes a body fastener interface configured to accept a permanent fixed fastener to attach the fairing panel retainer to the vehicle body. Each of the panel attachment segments can include a panel fastener interface, for example, a bore through the panel attachment segment and a fastener plate slidably attached to a lower surface of the panel attachment segment. The body fastener interfaces and the panel fastener interfaces can be closely aligned along a longitudinal line or arc of the retainer strip. The fairing panel retainer can also include a transition surface to provide a smooth transition from the vehicle body surface to a fairing panel.

23 Claims, 3 Drawing Sheets

FAIRING PANEL RETAINER APPARATUS

FIELD OF THE INVENTION

The present disclosure relates generally to aerodynamic structures. More particularly, the present disclosure relates to aerodynamic surface panel retainment.

BACKGROUND OF THE INVENTION

A fairing is a member or structure whose primary function is to produce a smooth outline and to reduce aerodynamic drag. A fairing can join two surfaces so that the external surfaces blend smoothly. Fairings can be used on vehicles of all types, from motorcycles to airplanes, as well as on the exterior of other structures, such as buildings. For example, fairings can be used to cover otherwise open areas on the exterior of a vehicle or structure. A fairing also can be used to cover equipment or components installed on a vehicle that require periodic access.

As a specific example, a large fairing surface can be installed on some airplanes underneath the fuselage near the attachment point of the wings. One some airplanes, auxiliary equipment, such as a pressurization and environmental control system, inert gas generator, main landing gear or ram air turbine, can be is installed in this locale. The fairing provides a covering on the underside of the airplane with a smooth transition from the external fuselage surface to the fairing surface. A fairing can include a single, undivided surface, or a fairing can include multiple fairing panels attached to a frame structure. As another example, a protective fairing surface can be installed over a radar antenna on an airplane.

In some existing configurations, edge fairing panels can be directly attached to a vehicle body surface using fasteners. In other existing configurations, edge fairing panels can be attached to an angular frame that is fastened to the vehicle body and forms an edge of the fairing surface. In such a configuration, the fasteners that attach the angular frame to the vehicle body can sometimes be significantly misaligned with the fasteners that attach the fairing panels to the angular frame, which can cause a significant moment to be transferred to the vehicle body structure, resulting from an aerodynamic force on the fairing panel. In addition, the corner formed by the angular frame can sometimes have a relatively abrupt edge that can disturb aerodynamic flow over the external surface of the fairing panels.

Accordingly, it is desirable to provide a method and apparatus that attaches a fairing panel to a vehicle body, in some instances producing a smooth aerodynamic transition from the vehicle body surface to the fairing panel surface, without transferring a substantial moment resulting from the aerodynamic force on the fairing panel to the vehicle body structure.

SUMMARY OF THE NVENTION

The foregoing needs are met, to a great extent, by the present invention, wherein in one aspect an apparatus is provided that in some embodiments can attach a fairing panel to a vehicle body, producing a smooth aerodynamic transition from the vehicle body external surface to the fairing panel external surface without transferring a substantial moment due to the aerodynamic force on the fairing panel to the vehicle body structure.

In accordance with one embodiment [aspect] of the present invention, a fairing panel retainer includes a retainer strip configured to at least partially conform to a body contour of a vehicle body. The retainer strip includes a plurality of body attachment segments configured to be attached to the vehicle body and a plurality of raised panel attachment segments interspersed among the body attachment segments and configured to be attached to a fairing panel.

In accordance with another embodiment [aspect] of the present invention, a fairing panel retainer includes means for retaining a fairing panel. The means for retaining include means for attaching to a vehicle body that generally conform to a body contour of the vehicle body. In addition, the means for retaining include raised means for attaching the fairing panel alternating with the means for attaching In accordance with yet another embodiment [aspect] of the present invention, a method of retaining a fairing panel, includes the steps of attaching a retainer to a contoured vehicle body by way of a fixed fastening device and attaching a fairing panel to the retainer by way of a laterally adjustable fastening device There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
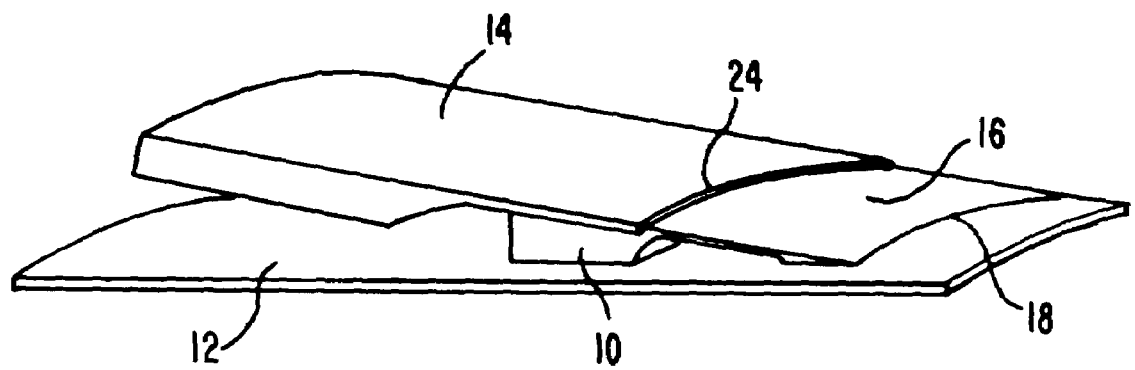
FIG. 1 is a perspective view illustrating a fairing panel attached to a vehicle body using a fairing panel retainer according to a preferred embodiment of the invention attaching a fairing panel to a vehicle body surface.

An embodiment in accordance with the present disclosure provides a fairing panel retainer, including a retainer strip that is configured to conform generally to a contour of a vehicle body. The retainer strip can include a series of body attachment segments alternating with raised panel attachment segments, essentially forming a series of corrugations in the retainer strip. The fairing panel retainer also can include a transition surface that provides a smooth transition from the vehicle body surface to the external surface of a fairing panel.

In addition, the body attachment segments and the panel attachment segments can include fastener interfaces to provide for attachment of the fairing panel retainer to the vehicle body, and for attachment of the fairing panel to the fairing panel retainer. The attachment interfaces can be generally aligned along a longitudinal line or arc of the retainer strip. Thus, the fairing panel retainer can provide for relatively easy and quick fairing panel installation, removal, and replacement, as well as relatively low aerodynamic drag. The invention will now be described with reference to the drawing figures, in which like reference numerals refer to like parts throughout.

An embodiment of the present inventive apparatus and method is illustrated in FIG. 1. A fairing panel retainer 10 can be attached to a vehicle body surface 12 and a fairing panel 14 can be attached to the fairing panel retainer 10. The fairing panel retainer 10 can include a transition surface 16 that can provide a smooth transition at a leading edge 18 adjacent to or in contact with the vehicle body surface 12. The transition surface 16 also can provide a smooth transition to the leading edge 24 of the fairing panel 14.

Figure 2:
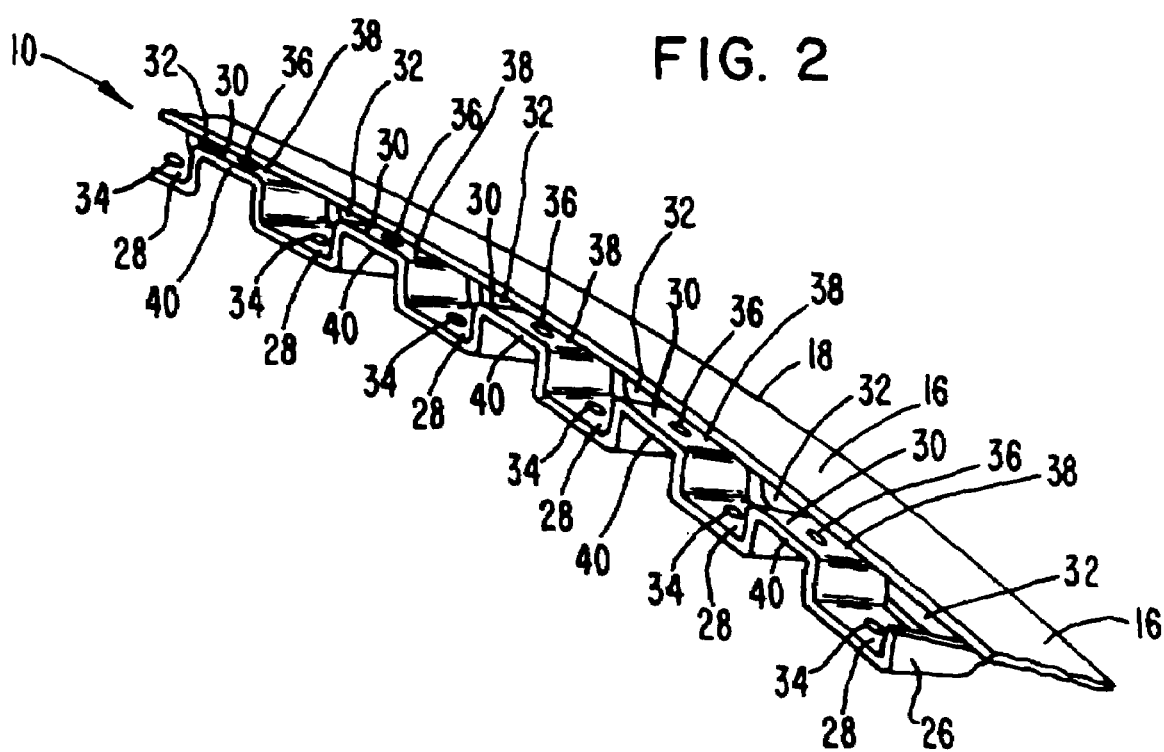
FIG. 2 is a perspective view of the fairing panel retainer of FIG. 1.

FIG. 2 shows the fairing panel retainer 10 of FIG. 1 in isolation. The fairing panel retainer 10 includes a retainer strip 26 that can be generally configured to at least partially conform to a contour of the vehicle body surface 12. The retainer strip 26 can include a series of body attachment segments 28 and raised panel attachment segments 30. In the embodiment of FIG. 2, the body attachment segments 28 alternate with the raised panel attachment segments 30, forming a generally corrugated shape with laterally aligned corrugations along the length of the retainer strip 26. That is, the ridges of the corrugation in the retainer strip 26 form the body attachment segment 30, and the grooves form the panel attachment segments 28.

In some embodiments, the retainer strip 26, the body attachment segments 28 and the panel attachment segments 30 can be formed or stamped from a relatively thin strip of metal, while in other embodiments, these can be machined from solid metal stock, including, for example, aluminum, titanium, steel, an alloy, or the like. In an alternative embodiment, the retainer strip 26, the body attachment segments 28 and the panel attachment segments 30 can be fabricated from a composite material, for example, a fiber reinforced polymer, such as an epoxy matrix reinforced with carbon, graphite, aramid, E-glass, or the like. In additional alternative embodiments, the retainer strip 26, the body attachment segments 28 and the panel attachment segments 30 can be made of any suitable material.

The transition surface 16 can be coupled to the retainer strip 26. In some embodiments, the retainer strip 26 and the transition surface 16 can be fabricated from a single, undivided metal piece. In other embodiments, the retainer strip 26 and the transition surface 16 can be separately fabricated and attached to one another, for example, by welding or using fasteners. In the embodiment shown in FIG. 2, each of the body attachment segments 28 includes a leading wall 32 that supports the transition surface 16. Additionally, the fairing panel retainer 10 can include an aft transition edge 34 configured to provide a smooth transition interface from the transition surface 16 to the fairing panel 14 (see FIG. 1).

Furthermore, in some embodiments, the fairing panel retainer 10 can be curved, for example, in order to generally conform to a partial circumference of an external surface of a generally cylindrical vehicle body surface 12. (See FIG. 1). In other embodiments, the fairing panel retainer 10 can have any suitable shape required to mate to a particular vehicle body surface 12. Additionally, a lower surface of the body attachment segments 28 can be configured to conform to the vehicle body 12. Likewise, the upper surface of the panel attachment segments 30 can be configured to mate with an inner surface of the fairing panel 14. Thus, for example, the panel attachment segments 30 can be sloped from a leading edge 38 to an aft edge 40 with respect to the lower surface of the body attachment segments 28.

In some embodiments, each of the body attachment segments 28 can include a body fastener interface 34, such as a bore through the retainer strip 26. Similarly, in other embodiments each of the raised panel attachment segments 30 also can include a panel fastener interface 36, such as a bore through the retainer strip 26.

Figure 3:
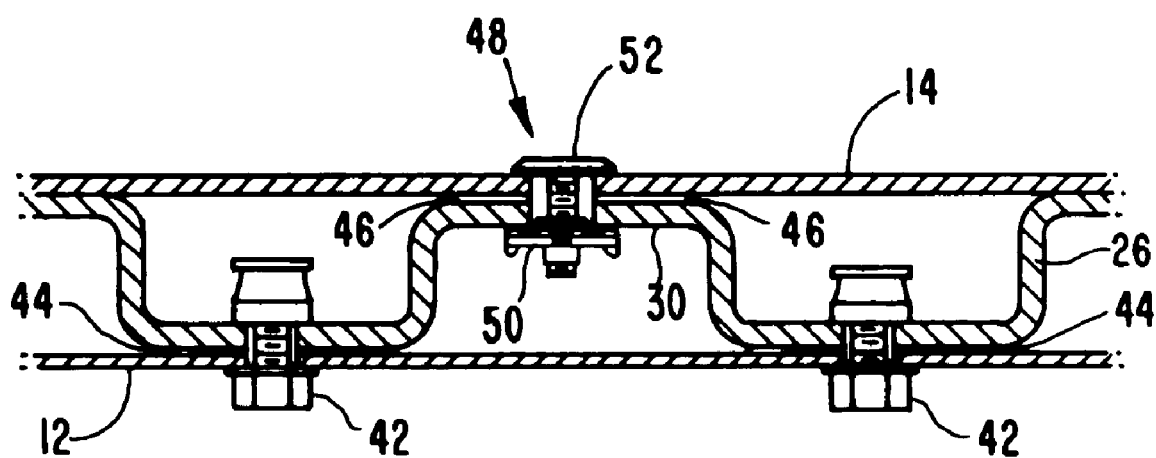
FIG. 3 is a partial cross section view of a fairing panel fastened to a vehicle body using the fairing panel retainer of FIG. 1

As illustrated in FIG. 3, in a preferred embodiment the body fastener interface 34 can be configured to interface with a permanent fastener 42, such as a rivet, a Hi-Lok fastening system, a screw, or the like. The permanent fastener 42 can attach the retainer strip 26 to the vehicle body surface 12. Furthermore, a resilient material 44, such as a gasket or an anticorrosion sealing compound, can be applied between the retainer strip 26 and the vehicle body surface 12. Likewise, in some embodiments a resilient material 46, such as a gasket or an anticorrosion sealing compound, can be applied between the retainer strip 26 and the fairing panel 14.

Similarly, the panel fastener interface 36 can be configured to interface with an adjustable fastening system 48. The adjustable fastening system 48 can attach the fairing panel 14 to the retainer strip 26. For example, the panel fastener interface 36 can include a fastener plate 50, such as the floating nutplate shown in FIG. 3, slidably attached to the lower surface of the panel attachment segment 30, that engages a fastener 52, such as a screw or a bolt. This configuration can allow the fastener plate to translate radially in all directions parallel to the lower surface of the panel attachment segment 30. For example, a fastener plate may be configured to travel, or float, 0.15 inch in all directions (0.3 inch diametrical or total translation).

Thus, lateral or longitudinal loads, or loads that are in a direction other than along the axis of the fastener, generally are not transferred from the fairing panel 14 (see FIG. 1) to the fairing panel retainer 10. Instead, primarily axial loads are transferred through the fastener in a direction normal to the surface of the panel attachment segment 30 from the fairing panel 14 to the fairing panel retainer 10. Thus, the adjustment of the fastener plate can provide stress relief for the fairing panel 14 (see FIG. 1).

Additionally, the adjustable fastening system can permit pre-drilling of the panel attachment interfaces 36 and the body attachment interfaces 34. As a result, the fairing retainer panel 10 can be located on the vehicle body surface 12 using manufacturing tooling to accurately locate the fairing panel retainer 10.

Furthermore, the adjustment of the fastener plates allows for attachment interfaces on the fairing panel 14 to be pre-drilled in an independent manufacturing process, so that the fairing panel 14 can be interchangeable, as compared to some existing fairing panels that are customized at the time of installation on a vehicle body surface, and are not interchangeable.

Moreover, the panel fastener interfaces 36 and the body fastener interfaces 34 can be generally aligned along a longitudinal line or arc along the length of the retainer strip 26. The alignment of the body fastener interfaces 34 and the panel fastener interface 36 can reduce or minimize the moment loading that is transferred from the fairing panel 14 (see FIG. 1) to the vehicle body surface 12 through the fairing panel retainer 10 due to an aerodynamic force on the fairing panel 14. Reducing the moment loading on the vehicle body surface 12 can reduce stress in the vehicle body surface 12 or supporting structure, and can lengthen the useful life of the vehicle body 12 surface by reducing the probability that fatigue cracking will initiate or will be promulgated through the vehicle body surface 12 or supporting structure.

Figure 4:
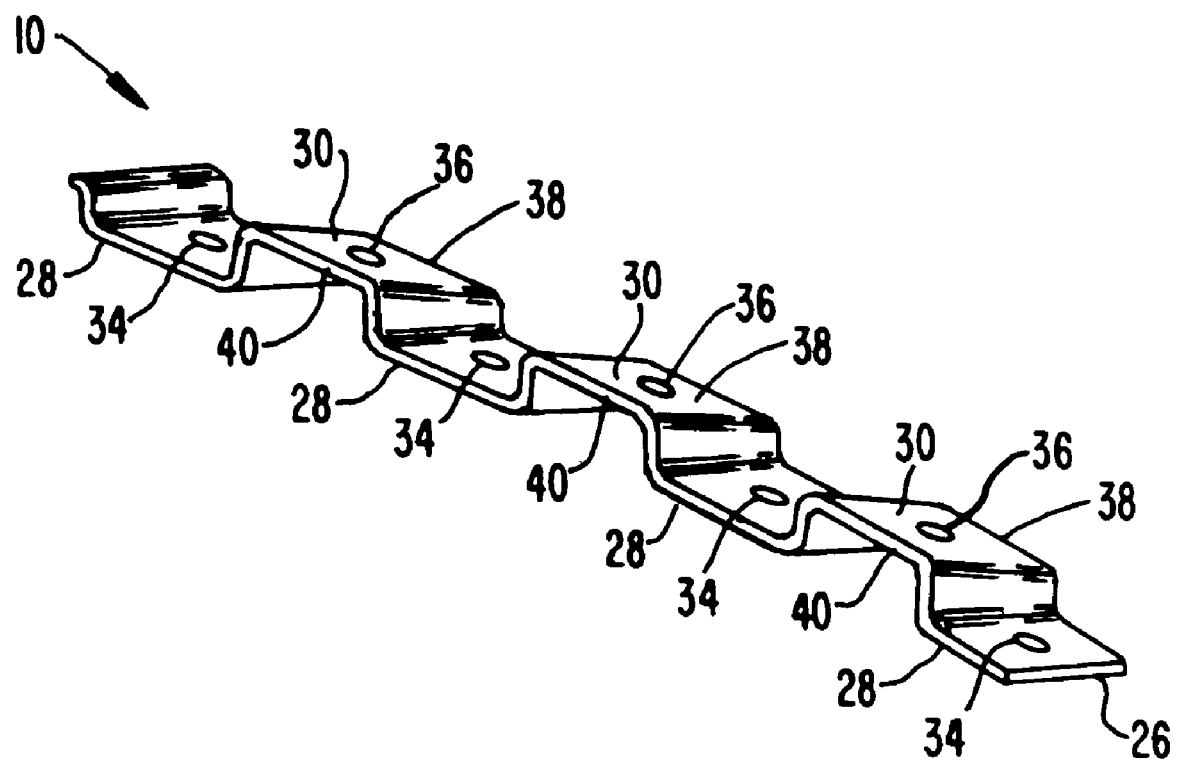
FIG. 4 is a perspective view of a fairing panel retainer according to an alternative embodiment of the invention.

FIG. 4 illustrates an alternative embodiment of the fairing panel retainer 10. This embodiment also can include a retainer strip 26 with alternating body attachment segments 28 and raised panel attachment segments 30 forming a generally corrugated shape with laterally aligned corrugations along the length of the retainer strip 26. As before, each of the body attachment segments 28 can include a body fastener interface 34, such as a bore through the retainer strip 26. Likewise, each of the panel attachment segments 30 can have a panel fastener interface 36, such as the bore through the retainer strip 26. Similarly, the panel fastener interface 36 optionally can include a fastener plate slidably attached to the lower surface of the panel attachment segment 30 in order to movably attach panel fasteners to the fairing panel retainer 10. As discussed above, the slidable fastener plates transmit primarily axial loads from the fasteners to the fairing panel retainer 10, and generally do not transmit forces in any direction that parallel to the lower surface of the panel attachment segments 30.

The alternative embodiment of FIG. 4, however, does not include a transitional surface, such as the transition surface 16 of FIG. 1. Thus, for example, the fairing panel retainer 10 shown in FIG. 4 can be used with a fairing panel 14 (see FIG. 1) that extends beyond the leading edge 38 of the retainer strip 26 to provide its own transition from the vehicle body surface 12 (see FIG. 1). As a result, the fairing panel retainer 10 of FIG. 4 can readily be formed or stamped from a single, undivided strip of metal, which can have a uniform thickness. Thus, the embodiment shown in FIG. 4 can provide a lightweight, low cost fairing panel retainer 10 that is especially easy to manufacture.

As described above, the panel attachment segments 30 can be configured to slope from a leading edge 38 to an aft edge 40 relative to the lower surface of the body attachment segments 28, in accordance with the requirements of a particular fairing panel 14 (see FIG. 1).

Although the terms "leading" and "aft" have been used here to distinguish between the lateral edges of the retainer strip, it will be understood that various embodiments of the fairing panel retainer can be used along a leading edge, lateral edges, a trailing edge, or another edge of a fairing panel structure.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A fairing panel retainer, comprising:
    a retainer strip configured to at least partially conform to a body contour of a vehicle body, the retainer strip comprising:
        a plurality of body attachment segments configured to be attached to the vehicle body; and
        a plurality of raised panel attachment segments interspersed among the body attachment segments and configured to be attached to a fairing panel.

2. The fairing panel retainer of claim 1, wherein the vehicle body has a generally cylindrical shape and the retainer strip is further configured to conform around a partial circumference of the vehicle body.

3. The fairing panel retainer of claim 1, wherein the body attachment segments alternate with the panel attachment segments.

4. The fairing panel retainer of claim 1, wherein the retainer strip further includes a series of lateral corrugations, wherein a corrugation ridge comprises one of the body attachment segments and a corrugation groove comprises one of the panel attachment segments.

5. The fairing panel retainer of claim 1, wherein a lower surface of each of the body attachment segments is configured to generally conform to the body contour.

6. The fairing panel retainer of claim 5, wherein an upper surface of each of the panel attachment segments is sloped from a first edge of the retainer strip to a second edge of the retainer strip with respect to the lower surface of each of the adjacent body attachment segments.

7. The fairing panel retainer of claim 1, wherein a lower surface of each of the body attachment segments is configured to mate to a body attachment surface.

8. The fairing panel retainer of claim 1, wherein an upper surface of each of the panel attachment segments is configured to mate to a fairing panel attachment surface.

9. The fairing panel retainer of claim 1, wherein each of the panel attachment segments includes a panel fastener interface.

10. The fairing panel retainer of claim 9, wherein the panel fastener interface further comprises:
    a bore through the associated panel attachment segment; and
    a fastener plate slidably attached to a lower surface of the associated panel attachment segment.

11. The fairing panel retainer of claim 9, wherein each of the body attachment segments includes a body fastener interface.

12. The fairing panel retainer of claim 11, wherein the panel fastener interface and the body fastener interface are substantially aligned along a longitudinal arc of the retainer strip.

13. The fairing panel retainer of claim 1, further comprising a transition surface configured to transition from a body surface to a fairing panel edge.

14. The fairing panel retainer of claim 13, wherein the transition surface further comprises:
    a body transition edge configured to provide a substantially smooth body transition from the body surface to the transition surface; and
    a fairing transition edge configured to provide a substantially smooth fairing transition from the body surface to the transition surface.

15. The fairing panel retainer of claim 1, wherein the retainer strip has a generally uniform thickness.

16. The fairing panel retainer of claim 1, wherein the retainer strip is formed from a metal strip.

17. The fairing panel retainer of claim 1, wherein the retainer strip is machined from a metal stock.

18. The fairing panel retainer of claim 1, wherein the retainer strip is made from a composite material.

19. The fairing panel retainer of claim 1, further comprising:
- a plurality of permanent fasteners to fasten the retainer strip to the vehicle body; and
- a plurality of adjustable fasteners to fasten the fairing panel to the retainer strip.

20. A fairing panel retainer, comprising:
- means for retaining a fairing panel, the means for retaining including:
- means for attaching to a vehicle body, the means for attaching generally conforming to a body contour of the vehicle body; and
- raised means for attaching the fairing panel alternating with the means for attaching.

21. The fairing panel retainer of claim 20, wherein the raised means for affixing include slidable means for fastening the fairing panel.

22. The fairing panel retainer of claim 21, wherein the means for attaching include fixed means for fastening the vehicle body, and the fixed means for fastening and the slidable means for fastening are substantially aligned along a longitudinal arc of the means for attaching.

23. The fairing panel retainer of claim 20, wherein the means for retaining further includes means for transitioning from a body surface to a fairing panel edge.

* * * * *